(12) United States Patent
Kuo et al.

(10) Patent No.: US 11,316,206 B2
(45) Date of Patent: Apr. 26, 2022

(54) ENERGY STORAGE DEVICE

(71) Applicants: NATIONAL CHENG KUNG UNIVERSITY, Tainan (TW); RISING CHEMICAL CO., LTD., Tainan (TW)

(72) Inventors: Ping-Lin Kuo, Tainan (TW); Chih-Hao Tsao, New Taipei (TW); Chia-Wei Chin, New Taipei (TW)

(73) Assignee: POLYBATT MATERIALS CO., LTD., Kaohsiung (TW)

( * ) Notice: Subject to any disclaimer, the term of this patent is extended or adjusted under 35 U.S.C. 154(b) by 228 days.

(21) Appl. No.: 16/857,198

(22) Filed: Apr. 24, 2020

(65) Prior Publication Data
US 2020/0343555 A1 Oct. 29, 2020

(30) Foreign Application Priority Data
Apr. 25, 2019 (TW) .................. 108114585

(51) Int. Cl.
| | |
|---|---|
| *H01M 4/13* | (2010.01) |
| *H01M 4/62* | (2006.01) |
| *H01M 50/411* | (2021.01) |
| *H01M 10/12* | (2006.01) |
| *C08F 220/42* | (2006.01) |
| *C08F 218/00* | (2006.01) |
| *H01G 9/02* | (2006.01) |
| *H01G 9/028* | (2006.01) |
| *H01G 9/042* | (2006.01) |
| *H01G 9/15* | (2006.01) |
| *H01M 10/0565* | (2010.01) |
| *H01M 10/42* | (2006.01) |

(52) U.S. Cl.
CPC ......... *H01M 10/128* (2013.01); *C08F 218/22* (2020.02); *C08F 220/42* (2013.01); *H01G 9/02* (2013.01); *H01G 9/028* (2013.01); *H01G 9/042* (2013.01); *H01G 9/15* (2013.01); *H01M 4/13* (2013.01); *H01M 4/622* (2013.01); *H01M 10/0565* (2013.01); *H01M 50/411* (2021.01); *H01M 2010/4292* (2013.01); *H01M 2300/0082* (2013.01)

(58) Field of Classification Search
CPC .... H01M 4/13; H01M 4/622; H01M 10/0565; H01M 50/411; H01M 2300/0082
See application file for complete search history.

(56) References Cited

U.S. PATENT DOCUMENTS 6,475,663 B1 * 11/2002 Mohwald ............ H01M 10/052
429/129
6,746,803 B1 * 6/2004 Bauer .................. H01M 50/449
429/315

(Continued)

*Primary Examiner* — Stewart A Fraser

(57) ABSTRACT

An energy storage device comprises two electrodes; and a separator disposed between the electrodes; wherein at least one of the electrodes and the separator comprises a copolymer, which serves as a non-aqueous binder and/or solid electrolyte for the electrodes and the separator of the energy storage device, and the copolymer is a copolymerized product or its derivative formed by the polymerization reaction of acrylonitrile and vinyl acetate. Therefore, the charge and discharge properties of the energy storage device using the copolymer can be improved, thereby effectively extending the efficiency and lifetime of the energy storage device.

14 Claims, 6 Drawing Sheets

(56) References Cited

U.S. PATENT DOCUMENTS

| | | | |
|---|---|---|---|
| 6,991,874 B1 * | 1/2006 | Mohwald | H01M 10/0565 |
| | | | 429/231.95 |
| 8,993,157 B2 | 3/2015 | Yang et al. | |
| 2010/0035158 A1 * | 2/2010 | Kato | C08L 53/025 |
| | | | 429/316 |

* cited by examiner

ENERGY STORAGE DEVICE

CROSS-REFERENCE TO RELATED APPLICATION

This non-provisional application claims priority under 35 U.S.C. § 119(a) on Patent Application No(s). 108114585 filed in Taiwan, R.O.C. on Apr. 25, 2019, the entire contents of which are hereby incorporated by reference.

BACKGROUND OF THE INVENTION

1. Field of the Invention

The present invention relates to an energy storage device, and more particularly to an energy storage device comprising a copolymer in at least one of the two electrodes and the separator, in which the copolymer is a copolymerized product or its derivative formed by the polymerization reaction of acrylonitrile and vinyl acetate.

2. Description of the Related Art

Energy storage devices are widely used in various electronic products. The physical and chemical properties of the copolymers used in the energy storage device have a certain degree of influence on the charge and discharge performance of the energy storage device. Therefore, how to modify the chemical structure of the copolymer to improve the charge and discharge performance of the energy storage device is the goal of those skilled in the art in the technical field to which the present invention pertains.

U.S. Pat. No. 8,993,157 B2 discloses an electrochemical cell, in which the copolymer (PVDF-g-PAN) used in the anode of the electrochemical cell comprises acrylonitrile grafted onto the polyvinylidene difluoride (PVDF) main chain.

BRIEF SUMMARY OF THE INVENTION

Copolymers used in conventional energy storage devices still need improvements in terms of improving the charge and discharge performance of energy storage devices. Therefore, an object of the present invention is to provide a novel energy storage device which has good charge and discharge performance and excellent processing characteristics.

To achieve the above and other objects, the present invention provides an energy storage device, which comprises:
  an anode and a cathode; and
  a separator disposed between the anode and the cathode;
  wherein at least one of the anode, the cathode and the separator comprises a copolymer, which serves as an aqueous or non-aqueous binder and/or electrolyte of the energy storage device, wherein the binder is suitable for the non-aqueous coating process of the cathode, the anode or the separator of a lithium battery, and the electrolyte includes a colloidal and a solid state, and the copolymer is a copolymerized product or its derivative formed by the polymerization reaction of acrylonitrile and at least one monomer containing an ion-conducting group and/or at least one olefinic monomer.

In an embodiment of the present invention, the energy storage device may be a battery, a capacitor, or a fuel cell.

In an embodiment of the present invention, the copolymer has the following structure:

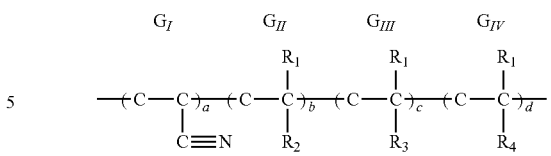

wherein
  $G_I$ is derived from acrylonitrile or at least one nitrile-containing monomer;
  $G_{II}$ is derived from at least one polar monomer containing an ion-conducting group, wherein $R_2$ comprises at least one of amide, an amino group, a pyrrolidone group, an ether group, an imidazole group, an ammonium group ($R-NH_3^+$, $(R)_2-NH_2^+$, $(R)_3-NH^+$, $(R)_4-N^+$), a carboxy group including acrylic acid, methacrylic acid, maleic acid, itaconic acid, etc., an sulfide-containing acid group such as a sulfonic acid group ($-SO_3H$) or a sulfuric group, an phosphide-containing acid group such as a phosphoric acid group ($-PO_3H_3$), an ester group derived from the above acid group, and a salt group derived from a quaternary ammonium group or a quaternary phosphorus group, such as the above acid group, pyrrolidone group or imidazole group, or a combination thereof;
  $G_{III}$ is derived from at least one monomer having a reactive functional group, wherein $R_3$ may comprise an ester group having a $C_1$-$C_{30}$ saturated or unsaturated alkyl group, a hydroxy group, an epoxy group, an isocyanate group, an amino group or a combination thereof;
  $G_{IV}$ is derived from at least one olefinic monomer; wherein $R_4$ may comprise a $C_1$-$C_{30}$ saturated or unsaturated alkyl group, a phenyl group, a benzyl group or a combination thereof;
  wherein $R_1$ is H or $CH_3$; and
  wherein the number of repeating units of the copolymer satisfies the following conditions:

$$\frac{a}{a+b+c+d} > 0, \frac{b}{a+b+c+d} > 0,$$

$$\frac{c}{a+b+c+d} \geq 0, \text{ and } \frac{d}{a+b+c+d} \geq 0,$$

$$\text{preferably } \frac{a}{a+b+c+d} > 30\% \text{ and } \frac{b}{a+b+c+d} > 2\%,$$

$$\text{and more preferably } 95\% > \frac{a}{a+b+c+d} > 70\%,$$

$$15\% > \frac{b}{a+b+c+d} > 2\%, 15\% > \frac{d}{a+b+c+d} > 2\%.$$

In an embodiment of the present invention, in the copolymer,
  $G_I$ is derived from acrylonitrile or at least one nitrile-containing monomer;
  $G_{II}$ is derived from at least one polar monomer containing an ion-conducting group, and may comprise at least one of n-vinylpyrrolidone, Acrylamide, methacrylamide, N,N-dimethyl acrylamide, N,N-diethyl acrylamide, Acryloyl morpholine, Acrylic acid, Methacrylic acid, vinyl acetate, Poly (ethylene glycol) methacrylate and polystyrene sulfonate, or a combination thereof;
  $G_{III}$ is derived from at least one monomer having a reactive functional group and may comprise Glycidyl methacrylate, Glycidyl acrylate, Vinyl epoxy cyclohexane, 2-(2-Oxiranylmethoxy)ethyl methacrylate, 2-Hydroxyethyl methacrylate, Allylamine, vinylamine, or a combination thereof; and $G_{IV}$ is derived from at least one olefinic monomer and may comprise 2-Ethylhexyl acrylate, n-Butyl acrylate, isobutyl acrylate, Methyl acrylate, Vinyl chloride, vinylidene chloride, vinyl bromide, Dibutyl Itaconate, Dimethyl maleate, Diethyl maleate, Dibutyl maleate, Styrene, Methyl methacrylate, 1,3-Butadiene, Isoprene, or a combination thereof.

To achieve the above and other objects, the present invention also provides an energy storage device, which comprises:

two electrodes; and a separator disposed between the electrodes;

wherein at least one of the electrodes and the separator comprises a copolymer having the following structure:

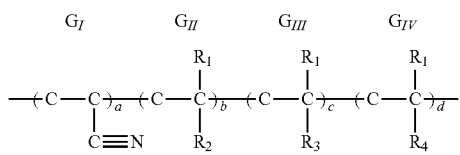

wherein:

$G_I$ is derived from acrylonitrile;

$G_{II}$ is derived from vinyl acetate;

$G_{III}$ is derived from at least one monomer having a reactive functional group, wherein $R_3$ comprises an ester group having a $C_1$-$C_{30}$ saturated or unsaturated alkyl group, a hydroxy group, an epoxy group, an isocyanate group, an amino group or a combination thereof; and $G_{IV}$ is derived from at least one olefinic monomer; wherein $R_4$ comprises an amide group, a pyrrolidone group, a $C_1$-$C_{30}$ saturated or unsaturated alkyl group, a phenyl group, a benzyl group or a combination thereof;

wherein $R_1$ is H or $CH_3$; and wherein the number of repeating units of the copolymer satisfies the following conditions:

$$\frac{a}{a+b+c+d} > 0, \frac{b}{a+b+c+d} > 0, \frac{c}{a+b+c+d} \geq 0,$$

and $\frac{d}{a+b+c+d} \geq 0$, and more preferably $95\% > \frac{a}{a+b+c+d} > 70\%$, $$15\% > \frac{b}{a+b+c+d} > 2\%, 15\% > \frac{d}{a+b+c+d} > 2\%.$$

In an embodiment of the present invention, in the copolymer:

$G_{III}$ is derived from at least one monomer having a reactive functional group, wherein the monomer having the reactive functional group is selected from the group consisting of methyl acrylate, Glycidyl methacrylate, Glycidyl acrylate, Vinyl epoxy cyclohexane, 2-(2-Oxiranylmethoxy) ethyl methacrylate, 2-Hydroxyethyl methacrylate, Allylamine and vinylamine; and $G_{IV}$ is derived from at least one olefinic monomer; wherein the olefinic monomer is selected from the group consisting of Acrylamide, N-Vinylpyrrolidone, N,N-Dimethylacrylamide, 2-Ethylhexyl acrylate, N-Vinylpyrrolidone, Vinyl chloride, vinylidene chloride, vinyl bromide, n-Butyl acrylate, isobutyl acrylate, Dibutyl Itaconate, Dimethyl maleate, Diethyl maleate, Dibutyl maleate, Styrene, Methyl acrylate, Vinyl pyridine, Methyl methacrylate, 1,3-Butadiene, and Isoprene.

In an embodiment of the present invention, the energy storage device is a battery, and the electrodes comprise an anode and a cathode.

In an embodiment of the present invention, the copolymer is further modified or cross-linked with a compound having an amino group, an isocyanate group, a Hydroxyl group, a Carboxylic group or an imidazole group; or Taurine, 1,3-Propanesultone, a derivative thereof, or a combination thereof.

The copolymer of the present invention can be prepared through radical polymerization, active radical polymerization, emulsion polymerization, or redox polymerization.

For example, an epoxy group in a repeating unit derived from at least one epoxy-containing monomer (e.g., glycidyl methacrylate) in the copolymer can undergo a ring-opening reaction, thereby linking a non-ionic, cationic or anionic group to achieve modification or cross-linking, or forming a cross-linked structure with another copolymer through the ring-opening reaction. Specifically, the copolymer may further react with, for example, polyether amine, taurine, polyether diamine, imidazole or a derivative thereof to achieve modification or cross-linking, and the modified or cross-linked copolymer can be applied to the energy storage device of the present invention.

In an embodiment of the present invention, an anode of the energy storage device comprises an active material, a conductive carbon and the copolymer, and a content of the copolymer is 0.01 to 30% by weight of the anode.

In an embodiment of the present invention, the content of the copolymer is 0.01 to 30% by weight of the cathode.

In an embodiment of the present invention, the separator is formed by coating a slurry or formula, wherein the content of the copolymer is 0.1 to 30% by weight of the slurry or formula.

In an embodiment of the present invention, the copolymer is blended with a polymer as a solid electrolyte of the energy storage device, and the content of the copolymer is 0.1 to 90% by weight of the solid electrolyte.

The energy storage device of the present invention has improved charge and discharge properties. By using specific copolymers, the efficiency and lifetime of the energy storage device can be effectively extended, and the energy storage device exhibits better processing characteristics at the same time.

DETAILED DESCRIPTION OF THE INVENTION

Figure 1:
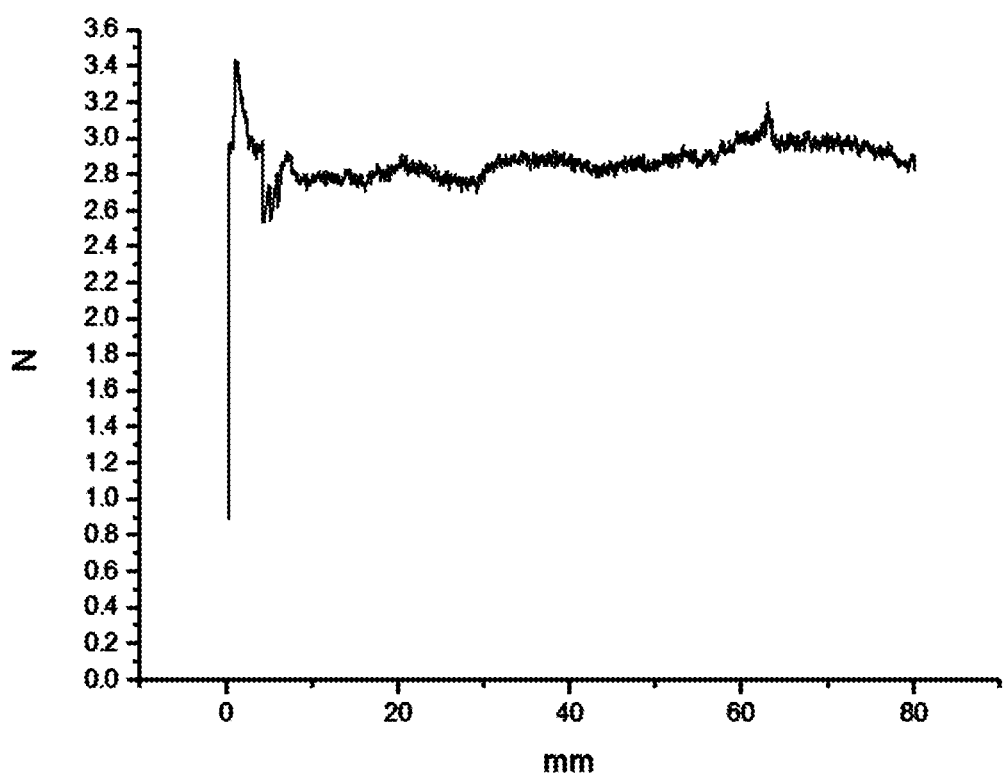
FIG. 1 shows the test result of adhesive force for the lithium nickel cobalt manganese oxide positive electrode comprising the copolymer P(AN-GMA-NVP).

To fully understand the object, features and effects of the present invention, a detailed description of the present invention will be provided through the following specific embodiments:

The copolymer used in the energy storage device of the present invention may be a copolymerized product or its derivative formed by the polymerization reaction of acrylonitrile and at least one monomer containing an ion-conducting group and/or at least one olefinic monomer. For example, the olefinic monomer may be vinyl pyrrolidone, methyl acrylate, poly(ethylene glycol)methacrylate, styrene, methyl methacrylate(acrylic monomer) or vinyl pyridine. Further, the copolymer may be a copolymerized product or its derivative formed by the polymerization reaction of acrylonitrile, at least one monomer containing an ion-conducting group, at least one olefinic monomer, and/or at least one epoxy-containing monomer. The epoxy-containing monomer may be glycidyl methacrylate, glycidyl acrylate, vinyl epoxy cyclohexane or 2-(2-Oxiranylmethoxy)ethyl methacrylate, and the copolymer may have the following structure:

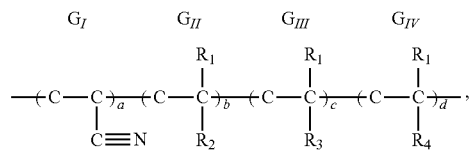

wherein:

$G_I$ is derived from acrylonitrile;

$G_{II}$ is derived from at least one polar monomer containing an ion-conducting group, wherein $R_2$ comprises at least one of amide, an amino group, a pyrrolidone group, an ether group, an imidazole group, an ammonium group ($R-NH_3^+$, $(R)_2-NH_2^+$, $(R)_3-NH^+$, $(R)_4-N^+$), a carboxy group including acrylic acid, methacrylic acid, maleic acid, itaconic acid, etc., an sulfide-containing acid group such as a sulfonic acid group ($-SO_3H$) or a sulfuric group, an phosphide-containing acid group such as a phosphoric acid group ($-PO_3H_3$), an ester group derived from the above acid group, and a salt group derived from a quaternary ammonium group or a quaternary phosphorus group, such as the above acid group, pyrrolidone group or imidazole group, or a combination thereof;

$G_{III}$ is derived from at least one monomer having a reactive functional group, wherein $R_3$ comprises a hydroxy group, an epoxy group, an isocyanate group, an amino group or a combination thereof;

$G_{IV}$ is derived from at least one olefinic monomer; wherein $R_4$ comprises a $C_1$-$C_{30}$ saturated or unsaturated alkyl group, a phenyl group, a benzyl group or a combination thereof;

wherein $R_1$ is H or $CH_3$; and wherein the number of repeating units of the copolymer satisfies the following conditions:

$$\frac{a}{a+b+c+d} > 0, \frac{b}{a+b+c+d} > 0,$$

$$\frac{c}{a+b+c+d} \geq 0, \text{ and } \frac{d}{a+b+c+d} \geq 0.$$

In an embodiment of the present invention, the number a of the repeating unit may be 100 to 50,000; the number b of the repeating unit may be 100 to 10,000; the number c of the repeating unit may be 100 to 10,000; and the number d of the repeating unit may be 100 to 10,000.

Example 1

Example 1-1: Preparation of P(AN-NVP)

2-propenenitrile and N-Vinylpyrrolidone were mixed and stirred at a ratio of 9:1 by weight, and then an appropriate amount of azobisisobutyl ether hydrochloride was added as the initiator. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile-pyrrolidone copolymer, which was named P(AN-NVP).

The synthesized product of Example 1-1 is shown as formula (IV):

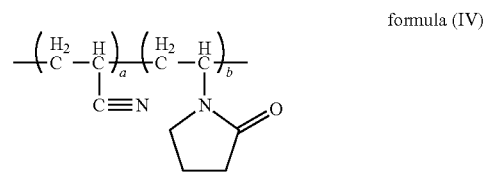

formula (IV)

and the ratio of a to b is 9:1.

Example 1-2: Preparation of P(AN-Am)

2-propenenitrile and methacrylamide were mixed and stirred at a ratio of 9:1 by weight, and then an appropriate amount of the initiator was added. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile-methyl methacrylate copolymer, which was named P(AN-Am).

The synthesized product of Example 1-2 is shown as formula (V):

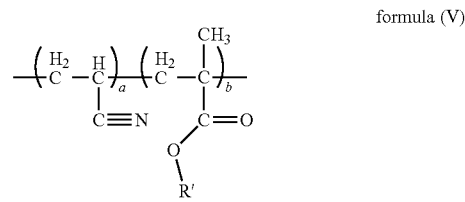

formula (V)

wherein $R_1$ is $-NH_2$;

R' is $-CH_3$; and the ratio of a to b is 9:1.

Example 1-3: Preparation of P(AN-AA)

2-propenenitrile and acrylic acid were mixed and stirred at a ratio of 9:1 by weight, and then an appropriate amount of the initiator was added. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile-acrylic acid copolymer, which was named P(AN-AA).

The synthesized product of Example 1-3 is shown as formula (VI):

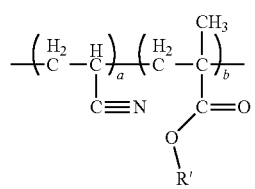

formula (VI)

wherein
the ratio of a to b is 9:1; and
$R_1$ and R' are H.

Example 1-4: Preparation of P(AN-GMA-NVP)

2-propenenitrile, glycidyl methacrylate and N-Vinylpyrrolidone were mixed and stirred at a ratio of 9:1:1 by weight, and then an appropriate amount of azobisisobutyl ether hydrochloride was added as the initiator. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile-glycidyl methacrylate-pyrrolidone copolymer, which was named P(AN-GMA-NVP).

The synthesized product of Example 1-4 is shown as formula (VII):

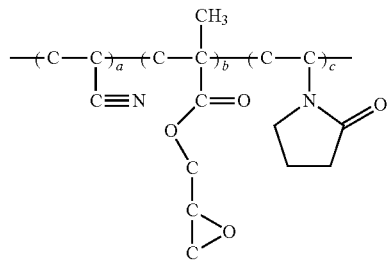

formula (VII)

and the ratio of a to b to c is 9:1:1

Example 1-5: Preparation of Polyether Amine-Modified P(AN-GMA-MMA) Copolymer 3 g of P(AN-GMA-MMA) synthesized from Example 1-4 was dissolved in 20 ml of NMP, into which 0.3 g of polyether amine (M1000, Huntsman) was added to react at 60° C. for 6 hours, thereby obtaining polyether amine-modified P(AN-GMA-MMA).

Example 1-6: Preparation of Polyether Diamine-Modified P(AN-GMA-MMA) Cross-Linking Polymer 3 g of P(AN-GMA-MMA) synthesized from Example 1-4 was dissolved in 20 ml of NMP, into which 0.3 g of polyether diamine (ED2003, Huntsman) was added to react at 60° C. for 6 hours, thereby obtaining polyether diamine-modified P(AN-GMA-MMA) cross-linking polymer.

Example 1-7: Preparation of Anionic Group-Modified P(AN-GMA-MMA) Copolymer 3 g of P(AN-GMA-MMA) synthesized from Example 1-4 was dissolved in 20 ml of NMP, into which 0.1 g of taurine was added to react at 60° C. for 6 hours, thereby obtaining anionic group-modified P(AN-GMA-MMA) cross-linking polymer.

Example 2

Example 2-1: Preparation of P(AN-ALi-PEGMA-VP)

2-propenenitrile, glycidyl methacrylate, polyethylene glycol methacrylate and N-Vinylpyrrolidone were mixed and stirred at a ratio of 9:1:0.5:0.5 by weight, and then an appropriate amount of the initiator was added. The mixture was heated to 60° C. and the reaction was continued for 12 hours. After 12 hours of reaction, 1 M of LiOH was added and stirred for 24 hours. The precipitated product was filtered by centrifugal filtration, and the resultant white solid was dried in the vacuum oven for 24 hours to obtain an acrylonitrile copolymer, which was named P(AN-ALi-PEGMA-VP).

The synthesized product of Example 2-1 is shown as formula (VIII):

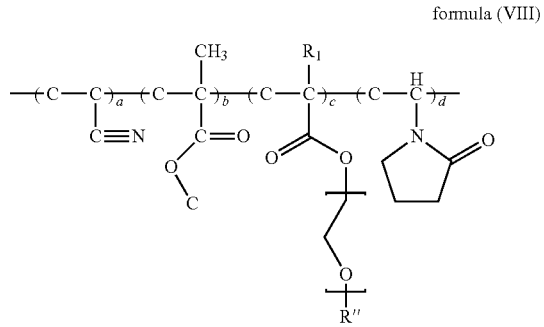

formula (VIII)

wherein $R_1$ is —$CH_3$;
R' is Li;
R" is —$CH_3$; and
the ratio of a to b to c to d is 9:1:0.5:0.5.

Example 2-2: Preparation of P(AN-GMA-PEGMA-MMA)

2-propenenitrile, glycidyl methacrylate, polyethylene glycol methacrylate and methyl methacrylate were mixed and stirred at a ratio of 9:1:0.5:0.5 by weight, and then an appropriate amount of the initiator was added. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile copolymer, which was named P(AN-GMA-PEGMA-MMA).

The synthesized product of Example 2-2 is shown as formula IX):

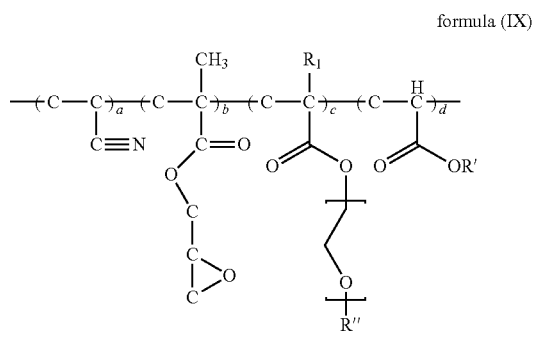

wherein $R_1$ is —$CH_3$;
R' is —$CH_3$;
R" is —$CH_3$; and
the ratio of a to b to c to d is 9:1:0.5:0.5.

Example 2-3: Preparation of P(AN-Am-VP-SSt)

2-propenenitrile, methacrylamide, N-Vinylpyrrolidone and sulfonated styrene were mixed and stirred at a ratio of 9:1:0.5:0.5 by weight, and then an appropriate amount of the initiator was added. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile copolymer, which was named P(AN-Am-VP-SSt).

The synthesized product of Example 2-3 is shown as formula (X):

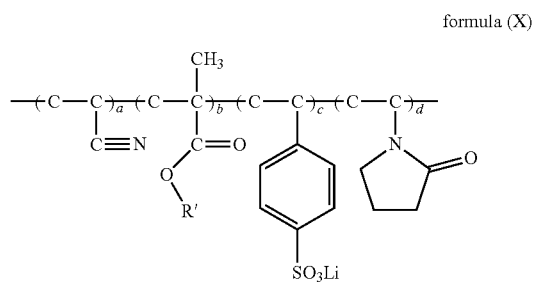

wherein R' is —$NH_2$; and
the ratio of a to b to c to d is 9:1:0.5:0.5.

Example 3

Example 3-1: Preparation of P(AN-GMA-PEGMA-MMA-VP)

2-propenenitrile, glycidyl methacrylate, polyethylene glycol methacrylate, methyl methacrylate and N-Vinylpyrrolidone were mixed and stirred at a ratio of 9:0.15:0.15:1:1 by weight, and then an appropriate amount of the initiator was added. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile copolymer, which was named P(AN-GMA-PEGMA-MMA-VP).

The synthesized product of Example 3-1 is shown as formula (XI):

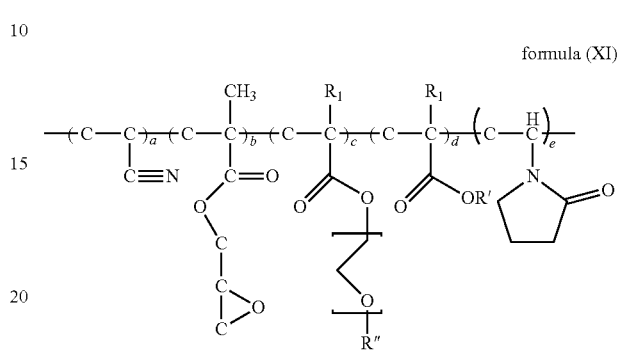

wherein $R_1$ is —$CH_3$;
R' is —$CH_3$;
R" is —$CH_3$; and
the ratio of a to b to c to d to e is 9:0.15:0.15:1:1.

Example 3-2: Preparation of P(AN-Mam-EG-VP-Im)

2-propenenitrile, N,N-Dimethylmethacrylamide, polyethylene glycol methacrylate, N-Vinylpyrrolidone and 1-Vinylimidazole were mixed and stirred at a ratio of 8.9:1:0.2:0.2:0.7 by weight, and then an appropriate amount of the initiator was added. The mixture was heated to 60° C. and the reaction was continued for 12 hours. After 12 hours of reaction, the precipitated product was filtered by centrifugal filtration, and the resultant white solid was dried in the vacuum oven for 24 hours to obtain an acrylonitrile copolymer, which was named P(AN-Mam-EG-VP-Im).

The synthesized product of Example 3-2 is shown as formula (XII):

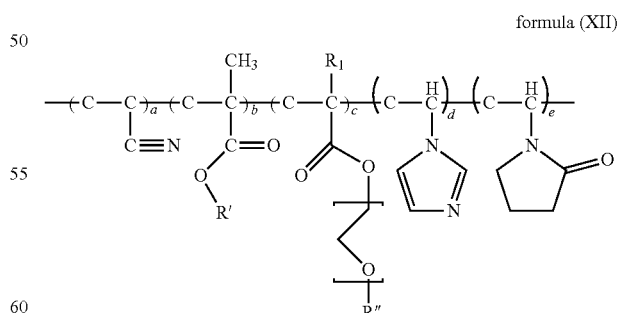

wherein $R_1$ is —$CH_3$;
R' is —$N(CH_3)_2$;
R" is —$CH_3$; and
the ratio of a to b to c to d to e is 8.9:1:0.2:0.2:0.7.

Example 4

Example 4-1: Preparation of Lithium Nickel Cobalt Manganese Oxide (Li(NiCoMn)O$_2$) Positive Electrode Pieces Using the Copolymers of Examples 1-1 to 3-2 as the Adhesive Respectively The copolymers prepared in Examples 1-1 to 3-2 were used as adhesives to mix respectively with the commercial toner (Super P) and the commercial lithium nickel cobalt manganese oxide (Li(NiCoMn)O$_2$, BASF) at a weight ratio of 2.1:2.5:95.4, and NMP was used as the solvent. Each mixture was stirred by the rotary blender (Haiyu) for 1 hour to obtain a stirred slurry, which was coated on the aluminum foil by the automatic coating machine (elcometer, 3570), put into the vacuum oven, heated at 100° C. for 24 hours, taken out, and then rolled with the roller to obtain a lithium nickel cobalt manganese oxide positive electrode piece comprising one of the copolymers of Examples 1-1 to 3-2.

Example 4-2: Pull Test of the Positive Electrode Comprising the Copolymer

The positive electrode pieces prepared from Example 4-1 were affixed to the 3M tape and subject to pull test using the pulling machine (ALGOL, JSV-HS1000).

Figure 2:
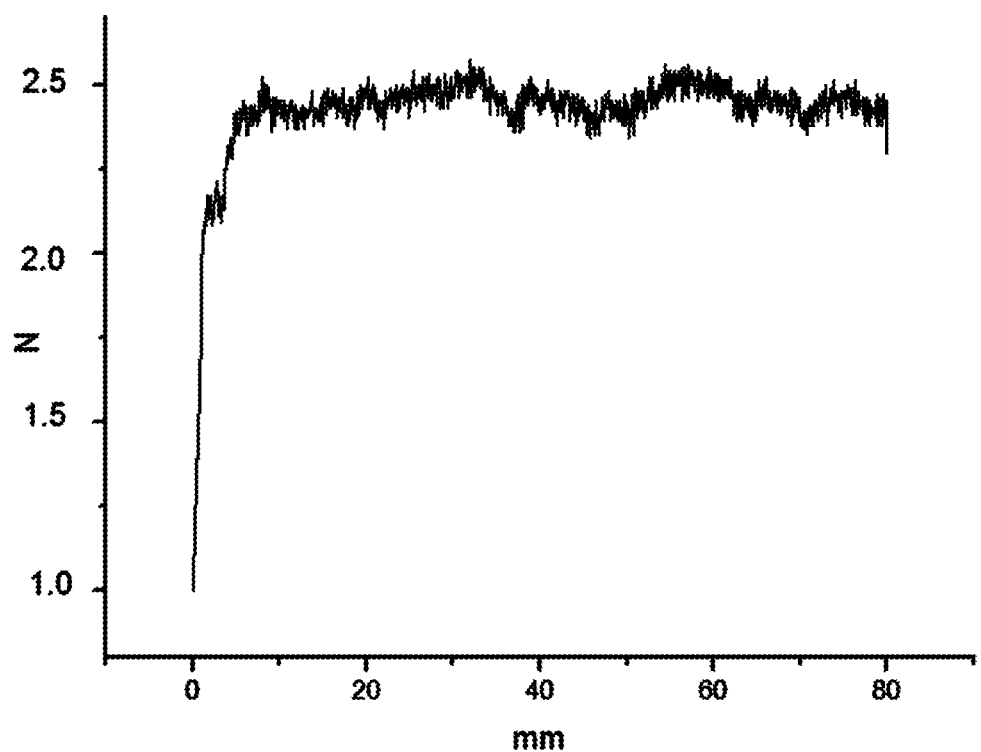
FIG. 2 shows the test result of adhesive force for the lithium nickel cobalt manganese oxide positive electrode comprising the copolymer P(AN-GMA-MMA).

FIG. 1 shows the pull test result of the positive electrode using P(AN-NVP) of Example 1-1 as the adhesive. FIG. 2 shows the pull test result of the positive electrode using P(AN-Am) of Example 1-2 as the adhesive. It can be observed that both Examples 1-1 and 1-2 have better adhesion than PVDF.

Example 4-3: Charge-Discharge Test of Lithium-Ion Batteries Using the Positive Electrode Comprising the Copolymer The positive electrode pieces prepared from Example 4-1 were assembled in the form of button batteries, respectively. First, the commercial polypropylene (PP) film was used as the separator and sandwiched between the lithium nickel cobalt manganese oxide (Li(NiCoMn)O$_2$) positive electrode and the lithium metal negative electrode. The charge and discharge performance of the lithium-ion half-cell using the positive electrode comprising the copolymer was measured with a small current automatic charge-discharge test system (AcuTech Systems, BAT-750B). The potential setting range was 2.8 to 4.2V, the charge current value was set to 0.1C, and the discharge current value was set to 0.1C, 0.5C, 1C, 3C, and 5C. The results are shown in the tables below.

The discharge capacity of the above lithium-ion half-cell using the positive electrode comprising the copolymer under different current value settings are shown in Tables 1 to 8. From Tables 1 to 8, it can be observed that even with different proportions and copolymer composition, the examples of the present invention serving as the electrode adhesive show excellent charge and discharge performance under different charge and discharge currents, compared with PVDF.

TABLE 1

Capacity of positive half-cell using the copolymer of Example 1-1 at different charge and discharge current values

| Discharge rate (C-rate) | C/10 | C/2 | 1C | 3C | 5C |
|---|---|---|---|---|---|
| Capacity (mAh g$^{-1}$) | 140 | 130 | 122 | 98 | 76 |

TABLE 2

Capacity of positive half-cell using the copolymer of Example 1-2 at different charge and discharge current values

| Discharge rate (C-rate) | C/10 | C/2 | 1C | 3C | 5C |
|---|---|---|---|---|---|
| Capacity (mAh g$^{-1}$) | 145 | 131 | 122 | 99 | 78 |

TABLE 3

Capacity of positive half-cell using the copolymer of Example 1-3 at different charge and discharge current values

| Discharge rate (C-rate) | C/10 | C/2 | 1C | 3C | 5C |
|---|---|---|---|---|---|
| Capacity (mAh g$^{-1}$) | 143 | 131 | 121 | 98 | 76 |

TABLE 4

Capacity of positive half-cell using the copolymer of Example 1-4 at different charge and discharge current values

| Discharge rate (C-rate) | C/10 | C/2 | 1C | 3C | 5C |
|---|---|---|---|---|---|
| Capacity (mAh g$^{-1}$) | 143 | 128 | 119 | 85 | 64 |

TABLE 5

Capacity of positive half-cell using the copolymer of Example 1-5 at different charge and discharge current values

| Discharge rate (C-rate) | C/10 | C/2 | 1C | 3C | 5C |
|---|---|---|---|---|---|
| Capacity (mAh g$^{-1}$) | 142 | 128 | 120 | 83 | 60 |

TABLE 6

Capacity of positive half-cell using the copolymer of Example 1-6 at different charge and discharge current values

| Discharge rate (C-rate) | C/10 | C/2 | 1C | 3C | 5C |
|---|---|---|---|---|---|
| Capacity (mAh g$^{-1}$) | 143 | 138 | 130 | 100 | 82 |

TABLE 7

Capacity of positive half-cell using the copolymer of Example 1-7 at different charge and discharge current values

| Discharge rate (C-rate) | C/10 | C/2 | 1C | 3C | 5C |
|---|---|---|---|---|---|
| Capacity (mAh g$^{-1}$) | 142 | 138 | 125 | 92 | 80 |

TABLE 8

Capacity of positive half-cell using the copolymer of Example 2-1 at different charge and discharge current values

| Discharge rate (C-rate) | C/10 | C/2 | 1C | 3C | 5C |
|---|---|---|---|---|---|
| Capacity (mAh g$^{-1}$) | 143 | 130 | 122 | 99 | 77 |

TABLE 9

Capacity of positive half-cell using the copolymer of Example 2-2 at different charge and discharge current values

| Discharge rate (C-rate) | C/10 | C/2 | 1C | 3C | 5C |
|---|---|---|---|---|---|
| Capacity (mAh g$^{-1}$) | 140 | 129 | 120 | 97 | 78 |

TABLE 10

Capacity of positive half-cell using the copolymer of Example 2-3 at different charge and discharge current values

| Discharge rate (C-rate) | C/10 | C/2 | 1C | 3C | 5C |
|---|---|---|---|---|---|
| Capacity (mAh g$^{-1}$) | 141 | 131 | 120 | 97 | 78 |

TABLE 11

Capacity of positive half-cell using the copolymer of Example 3-1 at different charge and discharge current values

| Discharge rate (C-rate) | C/10 | C/2 | 1C | 3C | 5C |
|---|---|---|---|---|---|
| Capacity (mAh g$^{-1}$) | 142 | 131 | 121 | 98 | 76 |

TABLE 12

Capacity of positive half-cell using the copolymer of Example 3-2 at different charge and discharge current values

| Discharge rate (C-rate) | C/10 | C/2 | 1C | 3C | 5C |
|---|---|---|---|---|---|
| Capacity (mAh g$^{-1}$) | 141 | 132 | 122 | 98 | 77 |

Example 5

Example 5-1: Preparation of Graphite Negative Electrode Pieces Using the Copolymers of Examples 1-1 to 3-2 as the Adhesive Respectively The copolymers prepared in Examples 1-1 to 3-2 were used as adhesives to mix respectively with the commercial toner (Super P) and the commercial graphite at a weight ratio of 3.8:1.8:94.4, and NMP was used as the solvent. Each mixture was stirred by the rotary blender (Haiyu) for 1 hour to obtain a stirred slurry, which was coated on the copper foil by the automatic coating machine (elcometer, 3570), put into the vacuum oven, heated at 100° C. for 24 hours, taken out, and then rolled with the roller to obtain a graphite negative electrode piece comprising one of the copolymers of Examples 1-1 to 3-2.

Example 5-2: Charge-Discharge Test of Lithium-Ion Batteries Using the Negative Electrode Comprising the Copolymer The negative electrode pieces prepared from Example 5-1 were assembled in the form of button batteries, respectively. First, the commercial polypropylene (PP) film was used as the separator and sandwiched between the graphite negative electrode and the lithium metal positive electrode. The charge and discharge performance of the lithium-ion half-cell using the negative electrode comprising the copolymer was measured with a small current automatic charge-discharge test system (AcuTech Systems, BAT-750B). The potential setting range was 0.05 to 2V, the charge current value was set to 0.1C, and the discharge current value was set to 0.1C, 0.5C, 1C, 3C, and 5C.

The discharge capacity of the above lithium-ion half-cell comprising the copolymer under different current value settings are shown in Tables 13 to 14. From Tables 13 to 14, it can be observed that both the copolymers of Examples 1-1 and 1-2 exhibit better performance than PVDF in the negative electrode test.

TABLE 13

Capacity of negative half-cell using the copolymer of Example 1-1 at different charge and discharge current values

| | Discharge rate (C-rate) | | | |
|---|---|---|---|---|
| | C/10 | C/2 | 1 C | 3 C |
| Capacity (mAh g$^{-1}$) | 349 | 304 | 233 | 59 |

TABLE 14

Capacity of negative half-cell using the copolymer of Example 1-2 at different charge and discharge current values

| | Discharge rate (C-rate) | | | |
|---|---|---|---|---|
| | C/10 | C/2 | 1 C | 3 C |
| Capacity (mAh g$^{-1}$) | 352 | 303 | 230 | 57 |

Example 6

Example 6-1: Preparation of Ceramic Coating Separator Using the Copolymers of Example 1-1 as the Adhesive The copolymer prepared from Example 1-1 was used as the adhesive for coating on the mold-release film. The copolymer prepared from Example 1-1 was dissolved in NMP, followed by addition of $Al_2O_3$ powder. The $Al_2O_3$ powder and the copolymer were dispersed uniformly in NMP at a weight ratio of 8:2, coated on the mold-release film, and then baked to dry at 80° C., thereby obtaining a ceramic coating separator.

The ceramic coating separator prepared from Example 6-1 was assembled in the form of button batteries. First, the ceramic coating separator was used as the separator and sandwiched between the lithium nickel cobalt manganese oxide (Li(NiCoMn)$O_2$) positive electrode and the lithium metal negative electrode. The charge and discharge performance of the lithium-ion half-cell comprising the copolymer was measured with a small current automatic charge-discharge test system (AcuTech Systems, BAT-750B). The potential setting range was 0.05 to 2V, the charge current value was set to 0.1C, and the discharge current value was set to 0.1C, 0.5C, 1C, 3C, and 5C.

TABLE 15

Capacity of half-cell using the ceramic coating separator of Example 6-1 at different charge and discharge current values

| | Discharge rate (C-rate) | | | |
| --- | --- | --- | --- | --- |
| | C/10 | C/2 | 1 C | 3 C |
| Capacity (mAh g$^{-1}$) | 170 | 161 | 139 | 97 |

It can be understood from the above embodiments that the copolymer comprised in the energy storage device of the present invention may have one or more repeating units represented by formula (A) (e.g., Examples 2-3 and 3-2):

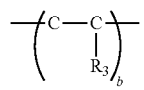

formula (A)

or one or more repeating units represented by formula (B) (e.g., Examples 2-2 and 3-1):

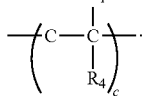

formula (B)

Further, the copolymer comprised in the energy storage device of the present invention may also have any combinations of the repeating units represented by formula (A) and formula (B) above.

Example 7

Example 7-1: Preparation of Lithium Nickel Cobalt Manganese Oxide (Li(NiCoMn)$O_2$) Positive Electrode Piece Using the Copolymers of Example 1-1 Blended with the Commercial PVDF as the Adhesive PVDF, the copolymers P(AN-NVP) of Example 1-1, the commercial Super P and the commercial lithium nickel cobalt manganese oxide (Li(NiCoMn)$O_2$, BASF) were mixed at a weight ratio of 1.05:1.05:2.5:95.4, and NMP was used as the solvent. The mixture was stirred by the rotary blender (Haiyu) for 1 hour to obtain a stirred slurry, which was coated on the aluminum foil by the automatic coating machine (elcometer, 3570), put into the vacuum oven, heated at 100° C. for 24 hours, taken out, and then rolled with the roller to obtain a lithium nickel cobalt manganese oxide positive electrode piece comprising the PVDF and the P(AN-NVP) of Example 1-1 as the adhesive.

Example 7-2

The PVDF lithium nickel cobalt manganese oxide positive electrode piece prepared from Example 7-1 was assembled in the form of button batteries. First, the commercial polypropylene (PP) film was used as the separator and sandwiched between the lithium nickel cobalt manganese oxide (Li(NiCoMn)$O_2$) positive electrode and the lithium metal negative electrode. The charge and discharge performance of the lithium-ion half-cell using the positive electrode comprising the pristine PVDF was measured with a small current automatic charge-discharge test system (AcuTech Systems, BAT-750B). The potential setting range was 2.8 to 4.2V, the charge current value was set to 0.1C, and the discharge current value was set to 0.1C, 0.5C, 1C, 3C, and 5C.

TABLE 16

Capacity of positive half-cell using the copolymer of Example 1-1 blended with PVDF at different charge and discharge current values

| | Discharge rate (C-rate) | | | | |
| --- | --- | --- | --- | --- | --- |
| | C/10 | C/2 | 1 C | 3 C | 5 C |
| Capacity (mAh g$^{-1}$) | 173 | 161 | 142 | 91 | 60 |

Comparative Example 1: Pristine PVDF Positive Electrode

Comparative Example 1-1: Preparation of Lithium Nickel Cobalt Manganese Oxide (Li(NiCoMn)$O_2$) Positive Electrode Material Using Polyvinylidene Difluoride (PVDF) as the Adhesive PVDF, the commercial Super P and the commercial lithium nickel cobalt manganese oxide (Li(NiCoMn)$O_2$, BASF) were mixed at a weight ratio of 2.1:2.5:95.4, and NMP was used as the solvent. The mixture was stirred by the rotary blender (Haiyu) for 1 hour to obtain a stirred slurry, which was coated on the aluminum foil by the automatic coating machine (elcometer, 3570), put into the vacuum oven, heated at 100° C. for 24 hours, taken out, and then rolled with the roller to obtain a lithium nickel cobalt manganese oxide positive electrode comprising the pristine PVDF as the adhesive.

Comparative Example 1-2

The PVDF Positive Electrode Piece Prepared from Comparative Example 1-1 was Affixed to the 3M Tape and Subject to Pull Test Using the Pulling Machine (ALGOL, JSV-HS1000).

Figure 3:
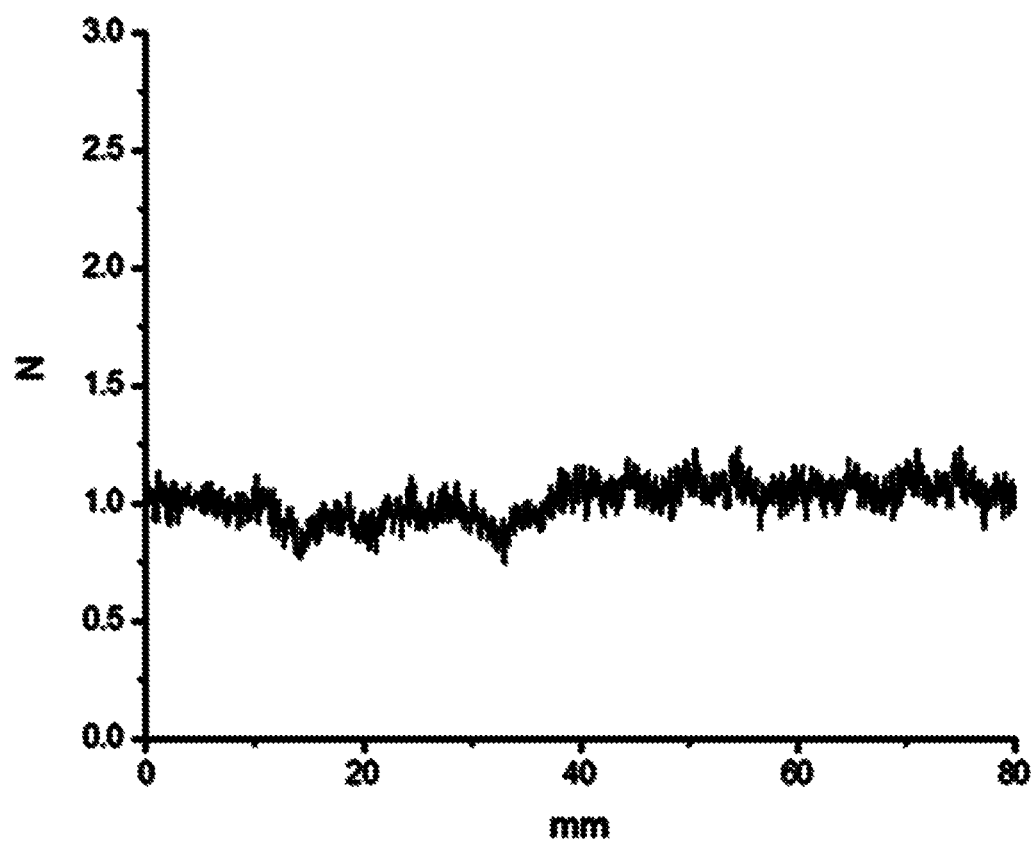
FIG. 3 shows the test result of adhesive force for the lithium nickel cobalt manganese oxide positive electrode comprising PVDF.
Figure 4:
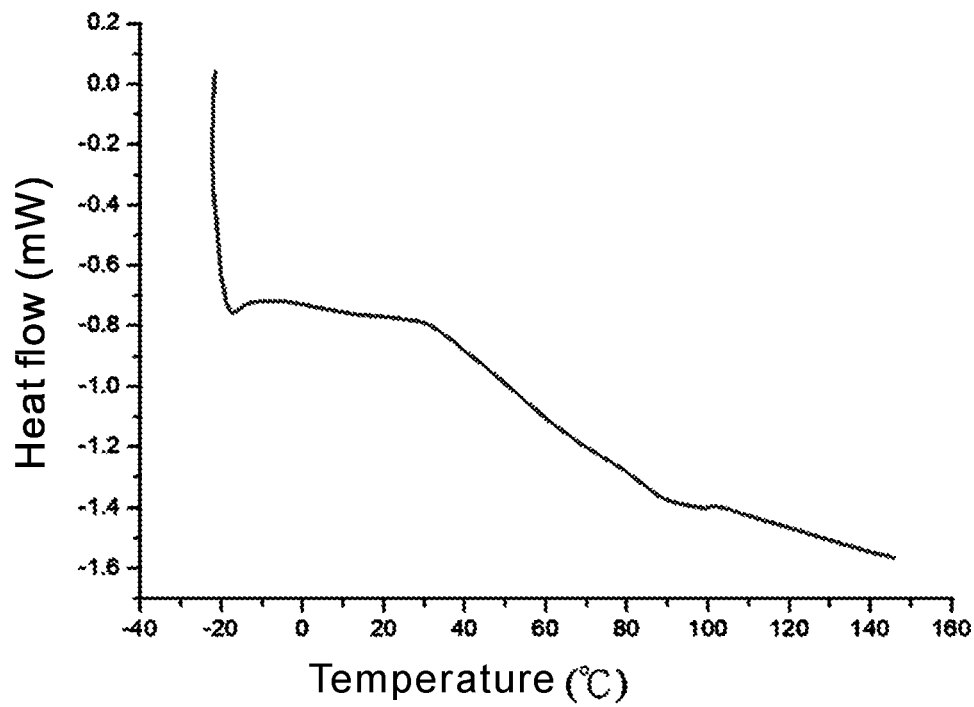
FIG. 4 shows the DSC test result of the copolymer from Example 8-1.
Figure 5:
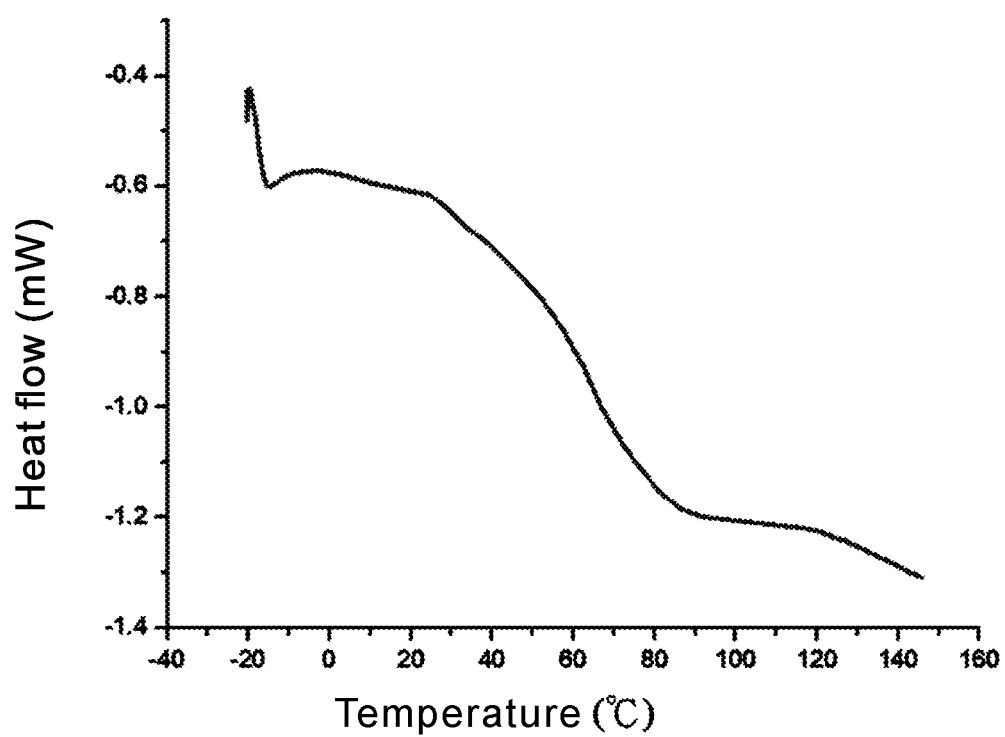
FIG. 5 shows the DSC test result of the copolymer from Example 8-2.
Figure 6:
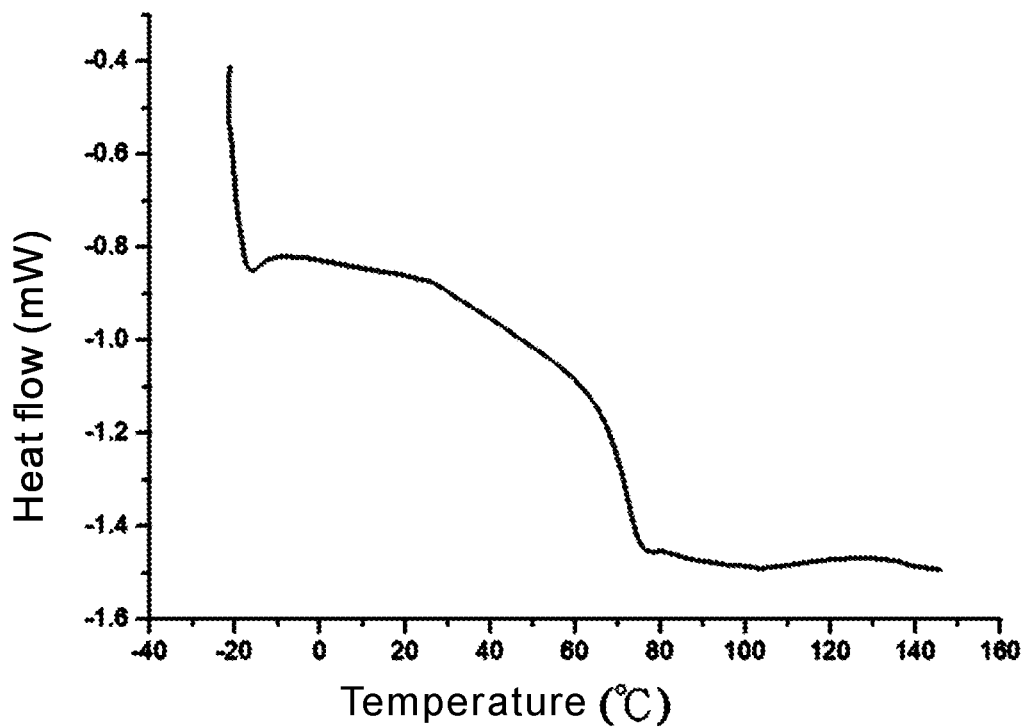
FIG. 6 shows the DSC test result of the copolymer from Example 8-3.
Figure 7:
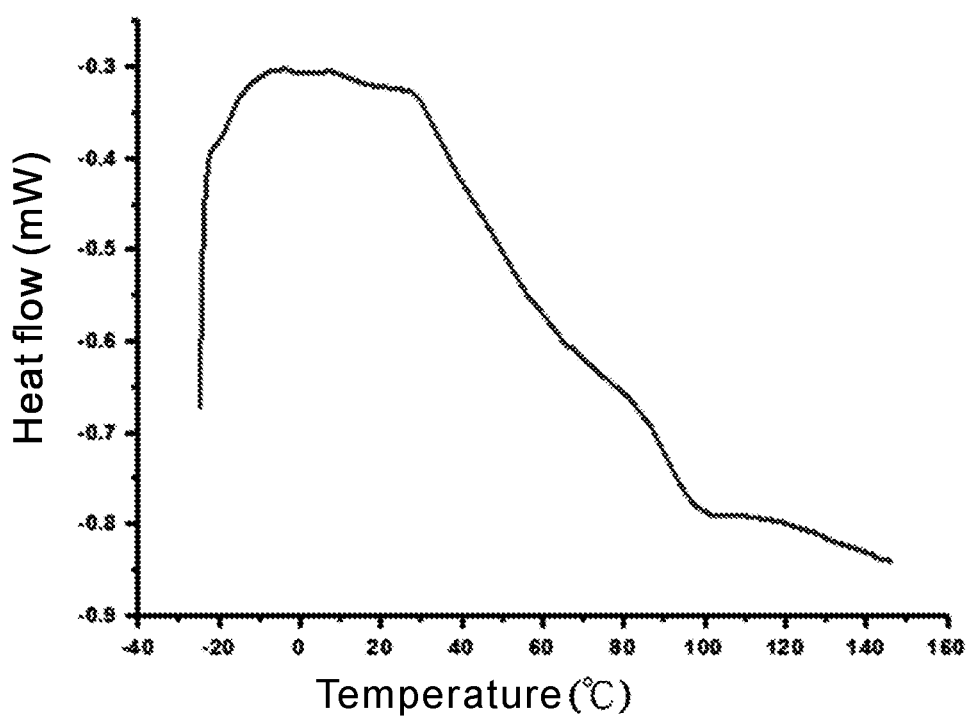
FIG. 7 shows the DSC test result of the copolymer from Example 8-4.
Figure 8:
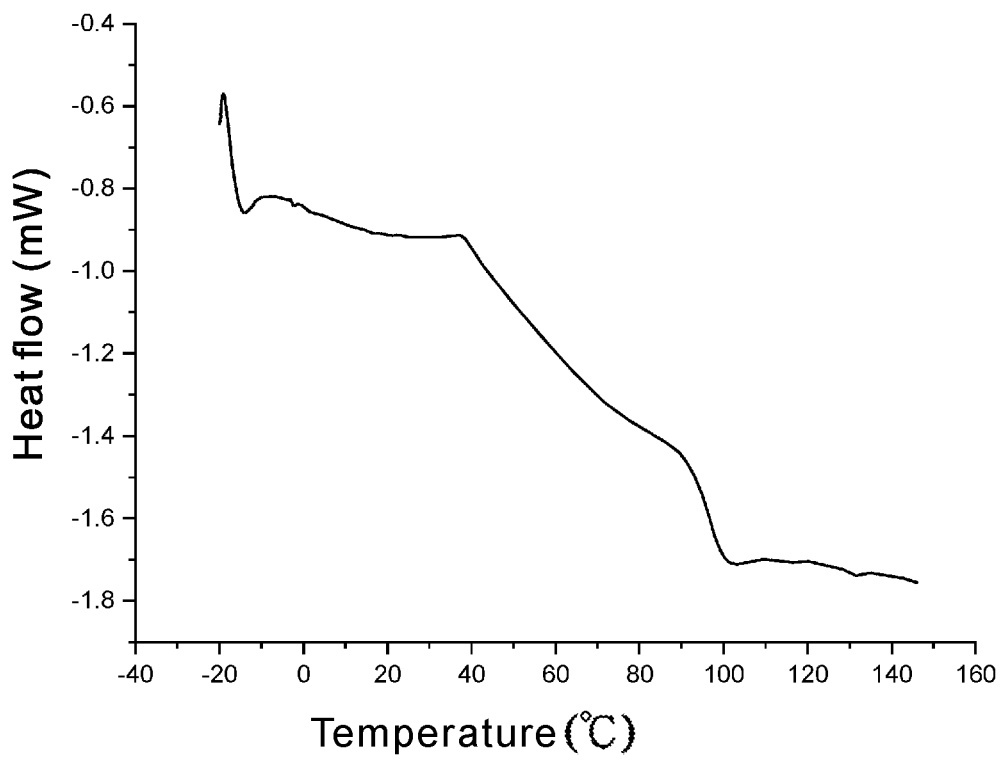
FIG. 8 shows the DSC test result of the copolymer from Example 8-5.
Figure 9:
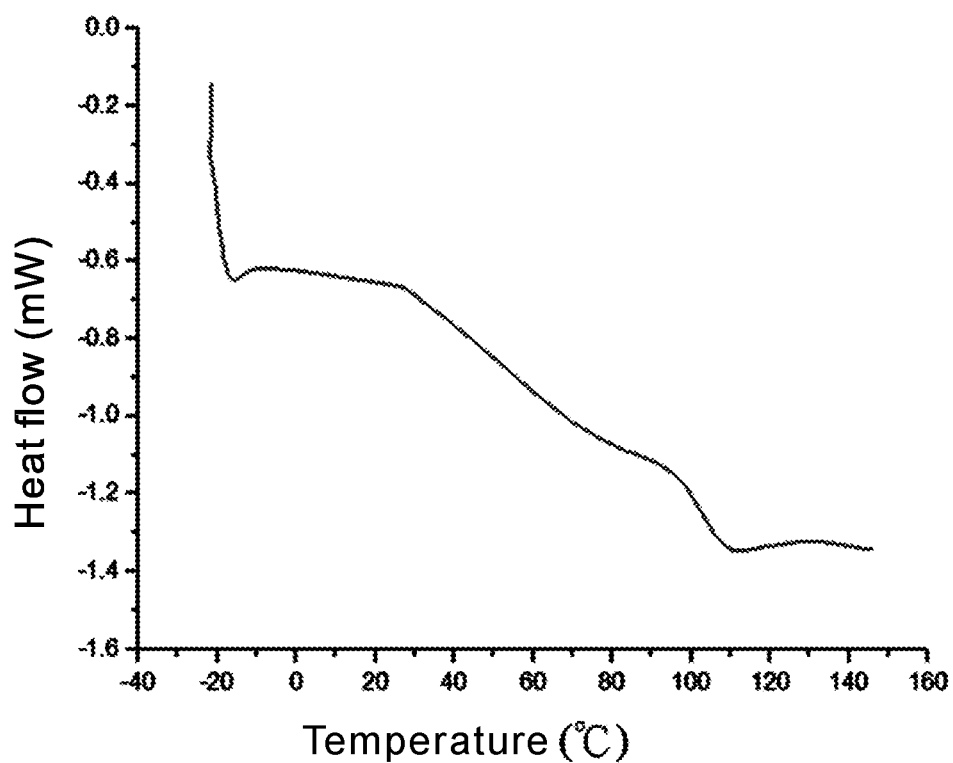
FIG. 9 shows the DSC test result of the copolymer from Comparative Example 3-1.
Figure 10:
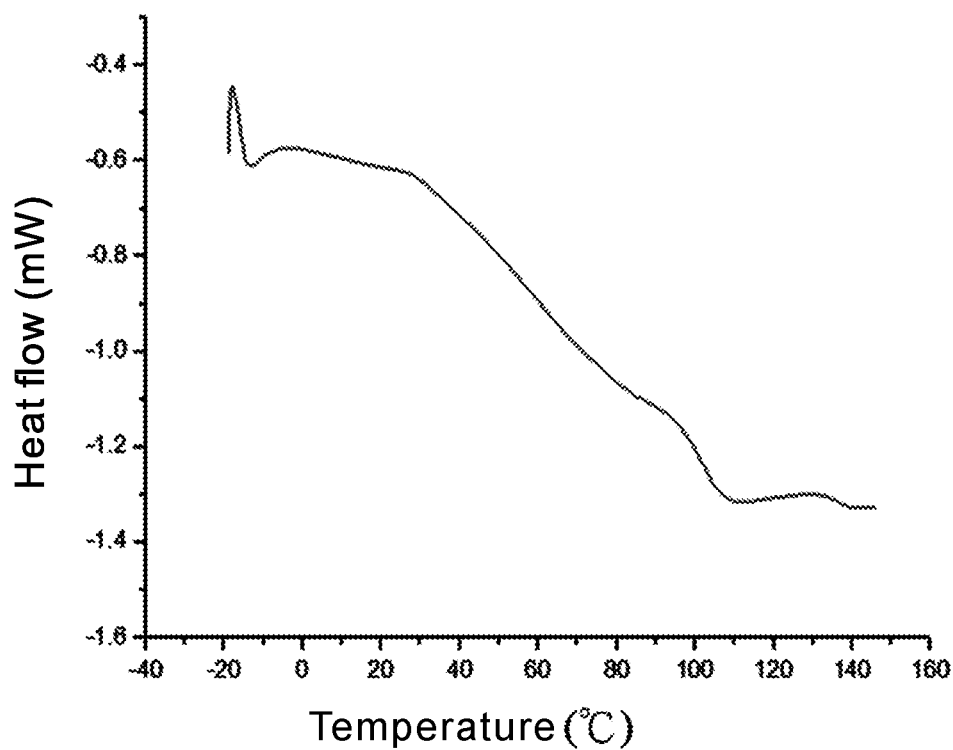
FIG. 10 shows the DSC test result of the copolymer from Comparative Example 3-2.
Figure 11:
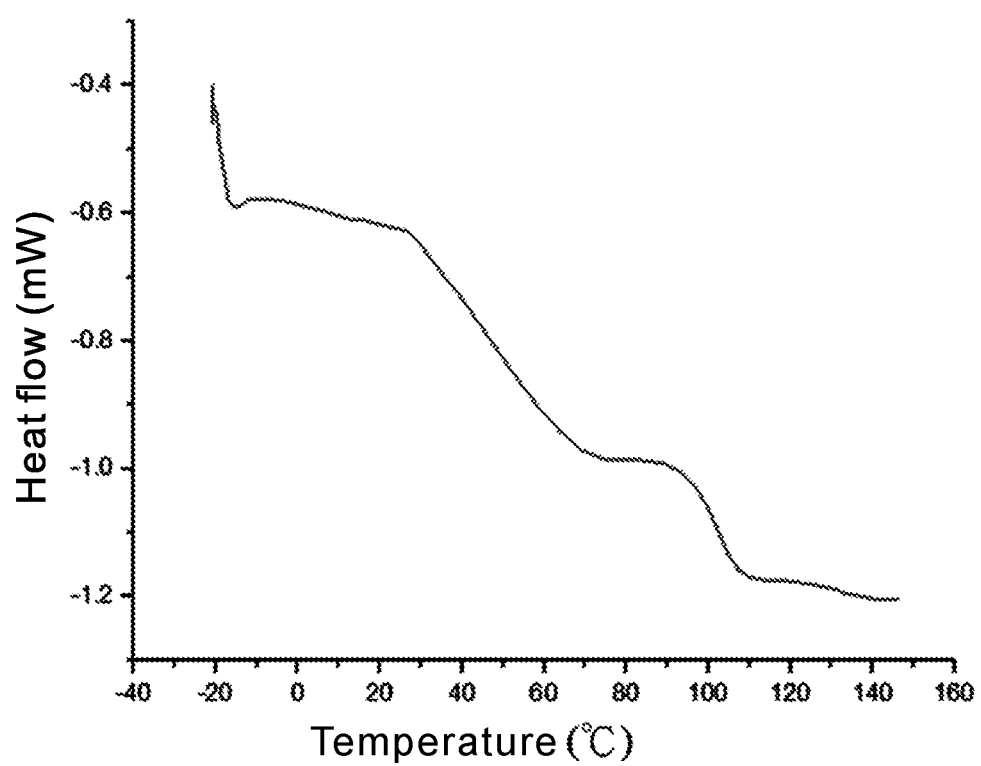
FIG. 11 shows the DSC test result of the copolymer from Comparative Example 3-3.

FIG. 3 shows the pull test result of the positive electrode of Comparative Example 1-1 using PVDF as the adhesive.

Comparative Example 1-3

The PVDF lithium nickel cobalt manganese oxide (Li(NiCoMn)O$_2$) positive electrode prepared from Comparative Example 1-1 was assembled in the form of button batteries. First, the commercial polypropylene (PP) film was used as the separator and sandwiched between the lithium nickel cobalt manganese oxide (Li(NiCoMn)O$_2$) positive electrode and the lithium metal negative electrode. The charge and discharge performance of the lithium-ion half-cell using the positive electrode comprising the pristine PVDF was measured with a small current automatic charge-discharge test system (AcuTech Systems, BAT-750B). The potential setting range was 2.8 to 4.2V, the charge current value was set to 0.1C, and the discharge current value was set to 0.1C, 0.5C, 1C, 3C, and 5C.

The discharge capacity of the positive lithium-ion half-cell of Comparative Example 1-3 at different setting of current value is shown in Table 17.

TABLE 17

|  | Discharge rate (C-rate) | | | | |
| --- | --- | --- | --- | --- | --- |
|  | C/10 | C/2 | 1 C | 3 C | 5 C |
| Capacity (mAh g$^{-1}$) | 141 | 128 | 115 | 60 | 0 |

Comparative Example 2: PVDF (Negative Electrode)

Comparative Example 2-1: Preparation of Graphite Negative Electrode Pieces Using PVDF as the Adhesive PVDF, the commercial Super P and the commercial graphite were mixed at a weight ratio of 2.1:2.5:95.4, and NMP was used as the solvent. The mixture was stirred by the rotary blender (Haiyu) for 1 hour to obtain a stirred slurry, which was coated on the copper foil by the automatic coating machine (elcometer, 3570), put into the vacuum oven, heated at 100° C. for 24 hours, taken out, and then rolled with the roller to obtain a graphite negative electrode comprising the PVDF adhesive.

Comparative Example 2-2

The PVDF graphite negative electrode prepared from Comparative Example 2-1 was assembled in the form of button batteries. First, the commercial polypropylene (PP) film was used as the separator and sandwiched between the lithium nickel cobalt manganese oxide (Li(NiCoMn)O$_2$) positive electrode and the PVDF graphite negative electrode. The charge and discharge performance of the lithium-ion half-cell using the negative electrode comprising PVDF adhesive was measured with a small current automatic charge-discharge test system (AcuTech Systems, BAT-750B). The potential setting range was 0.5 to 2V, the charge current value was set to 0.1C, and the discharge current value was set to 0.1C, 0.5C, 1C, 3C, and 5C.

The discharge capacity of the negative lithium-ion half-cell of Comparative Example 2-2 at different setting of current value is shown in Table 18.

TABLE 18

|  | Discharge rate (C-rate) | | | |
| --- | --- | --- | --- | --- |
|  | C/10 | C/2 | 1 C | 3 C |
| Capacity (mAh g$^{-1}$) | 350 | 295 | 216 | 47 |

From the results of FIGS. 1 to 3, it is obvious that the use of the copolymer of the present invention as the adhesive can make the slurry have a better adhesive effect than PVDF of Comparative Example 1 as the copolymer of the present invention has the repeating units derived from 2-propenenitrile.

From the results of FIGS. 1 to 3 and Tables 1 to 18, it can be seen that the lithium ion batteries prepared by using the copolymers of Examples 1-1 to 3-2 have excellent charge and discharge properties.

It can be understood from the test results of the above Examples and Comparative Examples that the energy storage device of the present invention includes a copolymer in at least one of the anode, the cathode, and the separator, and the copolymer is a copolymerized product or its derivative formed by the polymerization reaction of acrylonitrile and the monomer containing the ion-conducting group and/or the olefinic monomer. Therefore, the charge and discharge properties of the energy storage device using the copolymer can be improved, thereby effectively extending the efficiency and lifetime of the energy storage device.

Example 8

Example 8-1: Preparation of P(AN-VAc)

The reactive monomers, i.e. acrylonitrile and vinyl acetate, were mixed and stirred at a ratio of 70:30 by weight, and then an appropriate amount of azobisisobutyronitrile (AIBN) in dimethyl sulfoxide (DMSO) was added as the initiator. The mixture was heated to 60° C. and the reaction was continued for 12 hours. After 12 hours of reaction, the product was precipitated with methanol, and then the precipitated product was filtered by centrifugal filtration. The resultant white solid was dried in the vacuum oven for 24 hours to obtain an acrylonitrile copolymer, which was named P(AN-VAc).

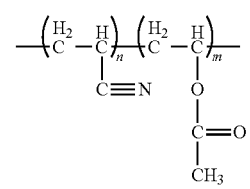

Example 8-2: Preparation of P(AN-VAc-MA)

The reaction scheme was the same as above except that the reaction monomers were replaced with acrylonitrile, vinyl acetate and methyl acrylate at a ratio of 80:10:10 by weight. The resultant acrylonitrile copolymer was named P(AN-VAc-MA).

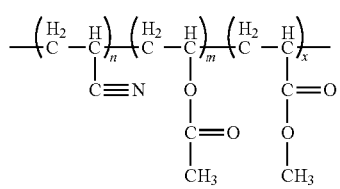

Example 8-3: Preparation of P(AN-VAc-MA-Am)

The reaction scheme was the same as above except that the reaction monomers were replaced with acrylonitrile, vinyl acetate, methyl acrylate and acrylamide at a ratio of 76:(9.5):(9.5):5 by weight. The resultant acrylonitrile copolymer was named P(AN-VAc-MA-Am).

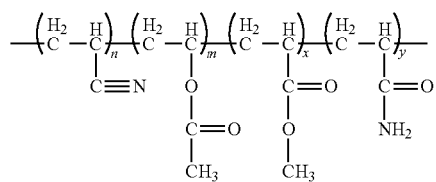

Example 8-4: Preparation of P(AN-VAc-MA-NVP)

The reaction scheme was the same as above except that the reaction monomers were replaced with acrylonitrile, vinyl acetate, methyl acrylate and N-Vinylpyrrolidone at a ratio of 76:(9.5):(9.5):5 by weight. The resultant acrylonitrile copolymer was named P(AN-VAc-MA-NVP).

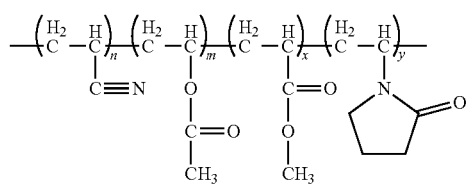

Example 8-5: Preparation of P(AN-VAc-MA-DMAA)

The reaction scheme was the same as above except that the reaction monomers were replaced with acrylonitrile, vinyl acetate, methyl acrylate and N,N-dimethylacrylamide at a ratio of 80:(7.5):(7.5):5 by weight. The resultant acrylonitrile copolymer was named P(AN-VAc-MA-DMAA).

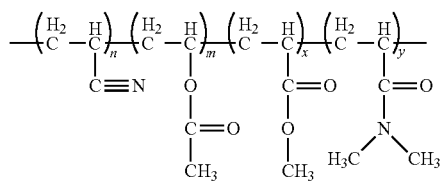

The average molecular weight of the copolymers of Examples 8-1 to 8-5 is between 10,000 and 1,500,000. In one embodiment, the copolymers of Examples 8-1 to 8-5 can be formed by solution polymerization, living polymerization, emulsion polymerization, dispersion polymerization, etc.

Example 9

Example 9-1: Preparation of Lithium Nickel Cobalt Manganese Oxide (Li(NiCoMn)O$_2$) Positive Electrode Pieces Using the Copolymers of Examples 8-1 to 8-5 as the Adhesive Respectively The copolymers prepared in Examples 8-1 to 8-5 were used as adhesives to mix respectively with the commercial toner (Super P) and the commercial lithium nickel cobalt manganese oxide (Li(NiCoMn)O$_2$, BASF) at a weight ratio of 2.5:2.5:95, and NMP was used as the solvent. Each mixture was stirred by the rotary blender (Haiyu) for 1 hour to obtain a stirred slurry, which was coated on the aluminum foil by the automatic coating machine (elcometer, 3570), put into the vacuum oven, heated at 100° C. for 24 hours, taken out, and then rolled with the roller to obtain a lithium ferrous phosphate positive electrode piece comprising one of the copolymers of Examples 8-1 to 8-5.

Example 9-2: Charge-Discharge Test of Lithium-Ion Batteries Using the Positive Electrode Comprising the Copolymer The positive electrode pieces prepared from Example 9-1 were assembled in the form of button batteries, respectively. First, the commercial polypropylene (PP) film was used as the separator and sandwiched between the lithium nickel cobalt manganese oxide (Li(NiCoMn)O$_2$) positive electrode and the lithium metal negative electrode. The charge and discharge performance of the lithium-ion half-cell using the positive electrode comprising the copolymer was measured with a small current automatic charge-discharge test system (AcuTech Systems, BAT-750B). The potential setting range was 2.8 to 4.2V, the charge current value was set to 0.1C, and the discharge current value was set to 0.1C, 1C, 3C, and 5C. The results are shown in the following tables.

TABLE 19

Capacity of positive half-cell comprising the copolymer of Example 8-1 at different charge and discharge current values

| | Discharge rate (C-rate) | | | |
|---|---|---|---|---|
| | C/10 | 1 C | 3 C | 5 C |
| Capacity (mAh g$^{-1}$) | 179 | 131 | 74 | 51 |

TABLE 20

Capacity of positive half-cell comprising the copolymer of Example 8-2 at different charge and discharge current values

| | Discharge rate (C-rate) | | | |
|---|---|---|---|---|
| | C/10 | 1 C | 3 C | 5 C |
| Capacity (mAh g$^{-1}$) | 165 | 119 | 65 | 12 |

TABLE 21

Capacity of positive half-cell comprising the copolymer of Example 8-3 at different charge and discharge current values

| | Discharge rate (C-rate) | | | |
|---|---|---|---|---|
| | C/10 | 1 C | 3 C | 5 C |
| Capacity (mAh g$^{-1}$) | 166 | 124 | 68 | 32 |

TABLE 22

Capacity of positive half-cell comprising the copolymer of Example 8-4 at different charge and discharge current values

| | Discharge rate (C-rate) | | | |
|---|---|---|---|---|
| | C/10 | 1 C | 3 C | 5 C |
| Capacity (mAh g$^{-1}$) | 170 | 132 | 66 | 32 |

TABLE 23

Capacity of positive half-cell comprising the copolymer of Example 8-5 at different charge and discharge current values

| | Discharge rate (C-rate) | | | |
|---|---|---|---|---|
| | C/10 | 1 C | 3 C | 5 C |
| Capacity (mAh g$^{-1}$) | 170 | 138 | 72 | 48 |

Comparative Example 3-1: Preparation of P(AN-MA-Am-MAALi)

The reactive monomers, i.e. acrylonitrile, methyl acrylate, acrylamide and lithiated methyl acrylate, were mixed and stirred at a ratio of 84:6:6:4 by weight, and then an ammonium persulfate (APS) in water was added as the initiator. The mixture was heated to 60° C. After 12 hours of reaction, the precipitated product was filtered by centrifugal filtration, and the resultant white solid was dried in the vacuum oven for 24 hours to obtain an acrylonitrile copolymer, which was named P(AN-MA-Am-MAALi).

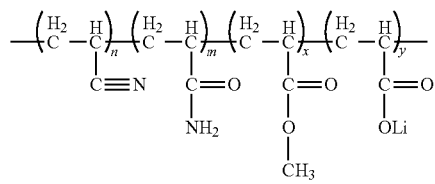

Comparative Example 3-2: Preparation of P(AN-MA-Am)

The reaction scheme was the same as above except that the reaction monomers were replaced with acrylonitrile, methyl acrylate and acrylamide at a ratio of 84:4:12 by weight. The resultant acrylonitrile copolymer was named P(AN-MA-Am).

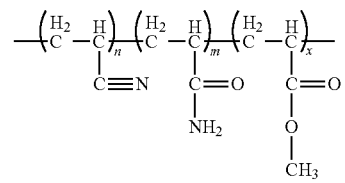

Comparative Example 3-3: Preparation of P(AN-MA-Am)II

The reaction scheme was the same as above except that the reaction monomers were replaced with acrylonitrile, methyl acrylate and acrylamide at a ratio of 91:4:5 by weight. The resultant acrylonitrile copolymer was named P(AN-MA-Am)II.

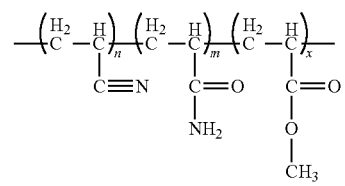

The average molecular weight of the copolymers of Comparative Examples 3-1 to 3-3 is between 10,000 and 1,500,000. In one embodiment, the copolymers of Comparative Examples 3-1 to 3-3 can be formed by solution polymerization, living polymerization, emulsion polymerization, dispersion polymerization, etc.

Comparative Example 3-4: Preparation of P(AN-MA-Am-MAALi)II

The reaction scheme was the same as above except that the reaction monomers were replaced with acrylonitrile, methyl acrylate, acrylamide and lithiated methyl acrylate at a ratio of 84:4:8:4 by weight. However, this comparative example could not be successfully prepared.

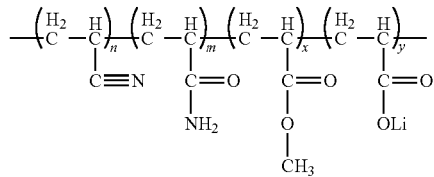

Comparative Example 4

Comparative Example 4-1: Preparation of Lithium Nickel Cobalt Manganese Oxide (Li(NiCoMn)O$_2$) Positive Electrode Pieces Using the Copolymers of Comparative Examples 3-1 to 3-4 as the Adhesive Respectively The copolymers prepared in Comparative Examples 3-1 to 3-4 were used as adhesives to mix respectively with the commercial toner (Super P) and the commercial lithium nickel cobalt manganese oxide (Li(NiCoMn)O$_2$, BASF) at a weight ratio of 2.5:2.5:95, and NMP was used as the solvent. Each mixture was stirred by the rotary blender (Haiyu) for 1 hour to obtain a stirred slurry, which was coated on the aluminum foil by the automatic coating machine (elcometer, 3570), put into the vacuum oven, heated at 100° C. for 24 hours, taken out, and then rolled with the roller to obtain a lithium ferrous phosphate positive electrode comprising one of the copolymers of Comparative Examples 3-1 to 3-4.

Comparative Example 4-2: Charge-Discharge Test of Lithium-Ion Batteries Using the Positive Electrode Comprising the Copolymer The positive electrode pieces prepared from Comparative Example 4-1 were assembled in the form of button batteries, respectively. First, the commercial polypropylene (PP) film was used as the separator and sandwiched between the lithium nickel cobalt manganese oxide ($Li(NiCoMn)O_2$) positive electrode and the lithium metal negative electrode. The charge and discharge performance of the lithium-ion half-cell using the positive electrode comprising the copolymer was measured with a small current automatic charge-discharge test system (AcuTech Systems, BAT-750B). The potential setting range was 2.8 to 4.2V, the charge current value was set to 0.1C, and the discharge current value was set to 0.1C, 1C, 3C, and 5C. The results are shown in the tables below.

TABLE 24

Capacity of positive half-cell comprising the copolymer of Comparative Example 3-1 at different charge and discharge current values

| | Discharge rate (C-rate) | | | |
| --- | --- | --- | --- | --- |
| | C/10 | 1 C | 3 C | 5 C |
| Capacity (mAh $g^{-1}$) | 174 | 120 | 7 | 1 |

TABLE 25

Capacity of positive half-cell comprising the copolymer of Comparative Example 3-2 at different charge and discharge current values

| | Discharge rate (C-rate) | | | |
| --- | --- | --- | --- | --- |
| | C/10 | 1 C | 3 C | 5 C |
| Capacity (mAh $g^{-1}$) | The preparation was in accordance with the comparative example, and the irreversibility of the first charge-discharge cycle was too large. | | | |

TABLE 26

Capacity of positive half-cell comprising the copolymer of Comparative Example 3-3 at different charge and discharge current values

| | Discharge rate (C-rate) | | | |
| --- | --- | --- | --- | --- |
| | C/10 | 1 C | 3 C | 5 C |
| Capacity (mAh $g^{-1}$) | The preparation was in accordance with the comparative example, and the irreversibility of the first charge-discharge cycle was too large. | | | |

TABLE 27

Capacity of positive half-cell comprising the copolymer of Comparative Example 3-4 at different charge and discharge current values

| | Discharge rate (C-rate) | | | |
| --- | --- | --- | --- | --- |
| | C/10 | 1 C | 3 C | 5 C |
| Capacity (mAh $g^{-1}$) | The copolymer cannot be successfully prepared. | | | |

Test Example 1: Differential Scanning Calorimetry (DSC) Comparison of Copolymers of Examples 8-1 to 8-5 and Comparative Examples 3-1 to 3-4

2 to 5 mg of the dried copolymer samples from Examples 8-1 to 8-5 and Comparative Examples 3-1 to 3-4 were taken, respectively. The DCS measurement range was −20 to 150° C., and the temperature was elevated 10° C. per minute to observe the glass transition temperature. The results are shown in FIG. 4 to FIG. 11.

As shown in FIG. 4 to FIG. 11, compared to Comparative Examples 3-1 to 3-3, Examples 8-1 to 8-5 of the present invention have lower glass transition temperatures (all between 40 to 80° C.). All the glass transition temperature of Comparative Example 3-1 to 3-3 are between 100 to 120° C., indicating that Examples 8-1 to 8-5 of the present invention have better flexibility and processability so relatively good rolling density and rollability can be obtained when making the electrode pieces.

It can be understood from the test results of the above Examples and Comparative Examples that the energy storage device of the present invention uses a copolymer in at least one of the anode, the cathode, and the separator, and the copolymer is a copolymerized product or a derivative of the copolymerized product formed by the polymerization reaction of acrylonitrile and vinyl acetate. Therefore, the charge and discharge properties of the energy storage device using the copolymer can be improved, thereby effectively extending the efficiency and lifetime of the energy storage device.

By including the monomer derived from vinyl acetate, the copolymers of Examples 8-1 to 8-5 can exhibit lower glass transition temperature and better flexibility and processability. In contrast, the copolymers of Comparative Examples 3-1 to 3-3 exhibit higher glass transition temperature and poor flexibility and processability due to the lack of the monomer derived from vinyl acetate.

Those described above are only the preferred embodiments of the present invention, and are not intended to limit the scope of the present invention. All the simple and equivalent variations and modifications made according to the claims and the description of the present invention are still within the scope of the present invention. Thus, the protection scope of the present invention shall be defined by the appended claims.

What is claimed is:

1. An energy storage device, comprising:
two electrodes; and
a separator disposed between the electrodes;
wherein at least one of the electrodes and the separator comprises a copolymer having the following structure:

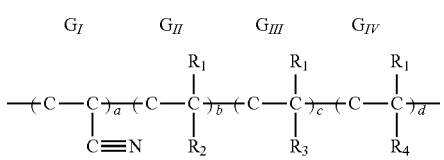

wherein:

$G_I$ is derived from acrylonitrile;

$G_{II}$ is derived from vinyl acetate;

$G_{III}$ is derived from at least one monomer having a reactive functional group, wherein $R_3$ comprises an ester group having a $C_1$-$C_{30}$ saturated or unsaturated alkyl group, a hydroxy group, an epoxy group, an isocyanate group, an amino group or a combination thereof; and $G_{IV}$ is derived from at least one olefinic monomer; wherein $R_4$ comprises an amide group, a pyrrolidone group, a $C_1$-$C_{30}$ saturated or unsaturated alkyl group, a phenyl group, a benzyl group or a combination thereof;

wherein $R_1$ is H or $CH_3$; and wherein the number of repeating units of the copolymer satisfies the following conditions:

$$\frac{a}{a+b+c+d} > 0, \frac{b}{a+b+c+d} > 0,$$
$$\frac{c}{a+b+c+d} \geq 0, \text{ and } \frac{d}{a+b+c+d} \geq 0.$$

2. The energy storage device of claim 1, wherein:

$G_{III}$ is derived from at least one monomer having a reactive functional group, wherein the monomer having the reactive functional group are selected from the group consisting of methyl acrylate, Glycidyl methacrylate, Glycidyl acrylate, Vinyl epoxy cyclohexane, 2-(2-Oxiranylmethoxy)ethyl methacrylate, 2-Hydroxyethyl methacrylate, Allylamine and vinylamine; and $G_{IV}$ is derived from at least one olefinic monomer; wherein the olefinic monomer is selected from the group consisting of Acrylamide, N-Vinylpyrrolidone, N,N-Dimethylacrylamide, 2-Ethylhexyl acrylate, N-Vinylpyrrolidone, Vinyl chloride, vinylidene chloride, vinyl bromide, n-Butyl acrylate, isobutyl acrylate, Dibutyl Itaconate, Dimethyl maleate, Diethyl maleate, Dibutyl maleate, Styrene, Methyl acrylate, Vinyl pyridine, Methyl methacrylate, 1,3-Butadiene, and Isoprene.

3. The energy storage device of claim 2, wherein the energy storage device is a battery, and the electrodes comprise an anode and a cathode.

4. The energy storage device of claim 3, wherein an anode of the energy storage device comprises an active material, a conductive carbon and the copolymer, and a content of the copolymer is 0.01 to 30% by weight of the anode, wherein the copolymer is used alone or blended with a polymer to serve as an anode adhesive.

5. The energy storage device of claim 3, wherein a content of the copolymer is 0.01 to 30% by weight of a cathode of the energy storage device, wherein the copolymer is used alone or blended with a polymer to serve as a cathode adhesive.

6. The energy storage device of claim 2, wherein the copolymer is further modified or cross-linked with a compound having an amino group, an isocyanate group, a Hydroxyl group, a Carboxylic group or an imidazole group; or Taurine, 1,3-Propanesultone, a derivative thereof, or a combination thereof.

7. The energy storage device of claim 2, wherein the separator is formed by coating a slurry or formula, wherein a content of the copolymer is 0.1 to 30% by weight of the slurry or formula.

8. The energy storage device of claim 2, wherein the copolymer is blended with a polymer as a solid electrolyte of the energy storage device, and a content of the copolymer is 0.1 to 90% by weight of the solid electrolyte.

9. The energy storage device of claim 1, wherein the energy storage device is a battery, and the electrodes comprise an anode and a cathode.

10. The energy storage device of claim 9, wherein an anode of the energy storage device comprises an active material, a conductive carbon and the copolymer, and a content of the copolymer is 0.01 to 30% by weight of the anode, wherein the copolymer is used alone or blended with a polymer to serve as an anode adhesive.

11. The energy storage device of claim 9, wherein a content of the copolymer is 0.01 to 30% by weight of a cathode of the energy storage device, wherein the copolymer is used alone or blended with a polymer to serve as a cathode adhesive.

12. The energy storage device of claim 1, wherein the copolymer is further modified or cross-linked with a compound having an amino group, an isocyanate group, a Hydroxyl group, a Carboxylic group or an imidazole group; or Taurine, 1,3-Propanesultone, a derivative thereof, or a combination thereof.

13. The energy storage device of claim 1, wherein the separator is formed by coating a slurry or formula, wherein a content of the copolymer is 0.1 to 30% by weight of the slurry or formula.

14. The energy storage device of claim 1, wherein the copolymer is blended with a polymer as a solid electrolyte of the energy storage device, and a content of the copolymer is 0.1 to 90% by weight of the solid electrolyte.

* * * * *